(12) United States Patent
Daniels et al.

(10) Patent No.: US 9,890,083 B2
(45) Date of Patent: *Feb. 13, 2018

(54) EXTRUDED GYPSUM-BASED MATERIALS

(71) Applicant: INTELLECTUAL GORILLA B.V., Amsterdam (NL)

(72) Inventors: Evan R. Daniels, Dallas, TX (US); Per Just Andersen, Dorfen (DE)

(73) Assignee: THE INTELLECTUAL GORILLA GMBH, Entlebuch (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/781,832

(22) PCT Filed: Mar. 5, 2014

(86) PCT No.: PCT/US2014/020865
§ 371 (c)(1),
(2) Date: Oct. 1, 2015

(87) PCT Pub. No.: WO2014/138283
PCT Pub. Date: Sep. 12, 2014

(65) Prior Publication Data
US 2016/0122247 A1 May 5, 2016

Related U.S. Application Data

(60) Provisional application No. 61/772,646, filed on Mar. 5, 2013, provisional application No. 61/772,648, filed on Mar. 5, 2013, provisional application No. 61/772,653, filed on Mar. 5, 2013.

(51) Int. Cl.
| | |
|---|---|
| *C04B 28/14* | (2006.01) |
| *B32B 13/02* | (2006.01) |
| *B32B 13/10* | (2006.01) |
| *B32B 21/14* | (2006.01) |
| *C04B 41/00* | (2006.01) |
| *C04B 41/45* | (2006.01) |
| *C04B 41/53* | (2006.01) |
| *C04B 111/00* | (2006.01) |

(52) U.S. Cl.
CPC ............ *C04B 28/14* (2013.01); *B32B 13/02* (2013.01); *B32B 13/10* (2013.01); *B32B 21/14* (2013.01); *C04B 41/009* (2013.01); *C04B 41/4543* (2013.01); *C04B 41/53* (2013.01); *B32B 2262/0223* (2013.01); *B32B 2262/0253* (2013.01); *B32B 2262/062* (2013.01); *B32B 2262/101* (2013.01); *B32B 2307/102* (2013.01); *B32B 2307/3065* (2013.01); *B32B 2307/7265* (2013.01); *B32B 2419/04* (2013.01); *C04B 2111/00129* (2013.01); *C04B 2111/00586* (2013.01); *Y02W 30/92* (2015.05); *Y02W 30/94* (2015.05); *Y02W 30/97* (2015.05)

(58) Field of Classification Search
CPC ........... C04B 11/00; C04B 28/14; C04B 7/02; C04B 14/06; C04B 14/42; C04B 16/06; C04B 16/0633; C04B 16/0641; C04B 16/065; C04B 18/08; C04B 18/141; C04B 18/26; C04B 20/002; C04B 40/02; C04B 41/009; C04B 41/4543; C04B 41/53; C04B 22/143; C04B 24/06; C04B 24/14; C04B 24/38; C04B 24/383; C04B 2103/0079; C04B 2103/002; C04B 2111/00129; C04B 2111/00586; B32B 13/02; B32B 13/10; B32B 21/14; B32B 2262/0223; B32B 2262/0253; B32B 2262/062; B32B 2262/101; B32B 2307/102; B32B 2307/3065; B32B 2307/7265; B32B 2419/04

See application file for complete search history.

(56) References Cited

U.S. PATENT DOCUMENTS

| | | |
|---|---|---|
| 570,391 A | 10/1896 | Fox |
| 1,048,923 A | 12/1912 | Wheeler |
| 3,517,468 A | 6/1970 | Woods |
| 3,852,083 A | 12/1974 | Yang |
| 3,908,062 A | 9/1975 | Roberts |
| 3,987,600 A | 10/1976 | Baehr |
| 3,994,110 A | 11/1976 | Ropella |
| 4,014,149 A | 3/1977 | Yamamoto |
| 4,045,937 A | 9/1977 | Stucky |

(Continued)

FOREIGN PATENT DOCUMENTS

| | | |
|---|---|---|
| CA | 2799983 A1 | 12/2012 |
| CN | 101113077 A | 1/2008 |

(Continued)

OTHER PUBLICATIONS

Search Report PCT/US07/04605, dated Oct. 4, 2007.
Search Report PCT US12/059053 dated Mar. 12, 2013.
International Search Report (KIPO) PCT/US2013/048642 dated Sep. 2, 2013.
International Search Report (KIPO) PCT/US2013/048712 dated Sep. 10, 2013.
International Search Report [KIPO] PCT/US2014/035313 dated Aug. 19, 2014.
International Search Report [KIPO] PCT/US2014/035277 dated Sep. 2, 2014.

(Continued)

*Primary Examiner* — Anthony J Green
(74) *Attorney, Agent, or Firm* — Daniel J. Chalker; Edwin S. Flores; Chalker Flores, LLP

(57) ABSTRACT

An extrudable gypsum-based material is formed from a mixture that includes gypsum in the range of about 40 to 90% by dry weight percent, a secondary material in the range of about 0.1 to 50% by dry weight percent, a reinforcement fiber in the range of about 1 to 20% by dry weight percent, a rheology modifying agent in the range of about 0.5 to 10% by dry weight percent, a retarder in the range of about 0.1 to 8% by dry weight percent, a water in the range of 10 to 50% of a total wet material weight.

21 Claims, No Drawings

(56) References Cited

U.S. PATENT DOCUMENTS

| | | |
|---|---|---|
| 4,075,804 A | 2/1978 | Zimmerman |
| 4,084,571 A | 4/1978 | McFarland |
| 4,159,302 A | 6/1979 | Greve et al. |
| 4,225,247 A | 9/1980 | Hodson |
| 4,225,357 A | 9/1980 | Hodson |
| 4,284,119 A | 8/1981 | Martin et al. |
| 4,302,127 A | 11/1981 | Hodson |
| 4,308,065 A | 12/1981 | Walls-Muycelo |
| 4,339,487 A | 7/1982 | Mullet |
| 4,343,127 A | 8/1982 | Greve et al. |
| 4,347,653 A | 9/1982 | Martin et al. |
| 4,398,842 A | 8/1983 | Hodson |
| 4,428,775 A | 1/1984 | Johnson et al. |
| 4,434,899 A | 3/1984 | Rivkin |
| 4,443,992 A | 4/1984 | Shechter |
| 4,489,121 A | 12/1984 | Luckanuck |
| 4,552,463 A | 11/1985 | Hodson |
| 4,660,338 A | 4/1987 | Wagner |
| 4,664,707 A | 5/1987 | Wilson et al. |
| 4,695,494 A | 9/1987 | Fowler et al. |
| 4,704,834 A | 11/1987 | Turner |
| 4,716,700 A | 1/1988 | Hagemeyer |
| 4,716,702 A | 1/1988 | Dickson |
| 4,800,538 A | 1/1989 | Passmore et al. |
| 4,811,538 A | 3/1989 | Lehnert et al. |
| 4,864,789 A | 9/1989 | Thorn |
| 4,889,428 A | 12/1989 | Hodson |
| 4,896,471 A | 1/1990 | Turner |
| 4,922,674 A | 5/1990 | Thorn |
| 4,944,595 A | 7/1990 | Hodson |
| 4,946,504 A | 8/1990 | Hodson |
| 4,998,598 A | 3/1991 | Mardian et al. |
| 5,061,319 A | 10/1991 | Hodson |
| 5,074,087 A | 12/1991 | Green |
| 5,100,586 A | 3/1992 | Jennings et al. |
| 5,108,677 A | 4/1992 | Ayres |
| 5,154,358 A | 10/1992 | Hartle |
| 5,169,566 A | 12/1992 | Stucky et al. |
| 5,232,496 A | 8/1993 | Jennings et al. |
| 5,239,799 A | 8/1993 | Bies et al. |
| 5,242,078 A | 9/1993 | Haas et al. |
| 5,305,577 A | 4/1994 | Richards et al. |
| 5,311,381 A | 5/1994 | Lee |
| 5,317,119 A | 5/1994 | Ayres |
| 5,339,522 A | 8/1994 | Paquin et al. |
| 5,344,490 A | 9/1994 | Roosen et al. |
| 5,347,780 A | 9/1994 | Richards et al. |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,395,571 A * | 3/1995 | Symons .............. C04B 28/00 264/42 |
| 5,401,588 A | 3/1995 | Garvey et al. |
| 5,417,024 A | 5/1995 | San Paolo |
| 5,433,189 A | 7/1995 | Bales et al. |
| 5,440,843 A | 8/1995 | Langenhorst |
| 5,453,310 A | 9/1995 | Andersen et al. |
| 5,482,551 A | 1/1996 | Morris et al. |
| 5,505,987 A | 4/1996 | Jennings et al. |
| 5,506,046 A | 4/1996 | Andersen et al. |
| 5,508,072 A | 4/1996 | Andersen et al. |
| 5,514,430 A | 5/1996 | Andersen et al. |
| 5,522,195 A | 6/1996 | Bargen |
| 5,527,387 A | 6/1996 | Andersen et al. |
| 5,540,026 A | 7/1996 | Gartland |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,557,899 A | 9/1996 | Dube et al. |
| 5,569,514 A | 10/1996 | Ayres |
| 5,580,409 A | 12/1996 | Andersen et al. |
| 5,580,624 A | 12/1996 | Andersen et al. |
| 5,582,670 A | 12/1996 | Andersen et al. |
| 5,601,888 A | 2/1997 | Fowler |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,644,870 A | 7/1997 | Chen |
| 5,653,075 A | 8/1997 | Williamson |
| 5,654,048 A | 8/1997 | Andersen et al. |
| 5,658,603 A | 8/1997 | Andersen et al. |
| 5,658,624 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Andersen et al. |
| 5,714,217 A | 2/1998 | Andersen et al. |
| 5,716,675 A | 2/1998 | Andersen et al. |
| 5,720,142 A | 2/1998 | Morrison |
| 5,720,913 A | 2/1998 | Andersen et al. |
| 5,736,209 A | 4/1998 | Andersen et al. |
| 5,738,921 A | 4/1998 | Andersen et al. |
| 5,740,635 A | 4/1998 | Gil et al. |
| 5,746,822 A * | 5/1998 | Espinoza .............. C04B 22/142 106/785 |
| 5,749,178 A | 5/1998 | Garmong |
| 5,753,308 A | 5/1998 | Andersen et al. |
| 5,766,525 A | 6/1998 | Andersen et al. |
| 5,776,388 A | 7/1998 | Andersen et al. |
| 5,782,055 A | 7/1998 | Crittenden |
| 5,783,126 A | 7/1998 | Andersen et al. |
| 5,786,080 A | 7/1998 | Andersen et al. |
| 5,798,010 A | 8/1998 | Richards et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,849,155 A | 12/1998 | Gasland |
| 5,851,634 A | 12/1998 | Andersen et al. |
| 5,868,824 A | 2/1999 | Andersen et al. |
| 5,879,722 A | 3/1999 | Andersen et al. |
| 5,887,402 A | 3/1999 | Ruggie et al. |
| 5,916,077 A | 6/1999 | Tang |
| 5,928,741 A | 7/1999 | Andersen et al. |
| 5,976,235 A | 11/1999 | Andersen et al. |
| 6,030,673 A | 2/2000 | Andersen et al. |
| 6,067,699 A | 5/2000 | Jackson |
| 6,083,586 A | 7/2000 | Andersen et al. |
| 6,090,195 A | 7/2000 | Andersen et al. |
| 6,115,976 A | 9/2000 | Gomez |
| 6,119,411 A | 9/2000 | Mateu Gil et al. |
| 6,161,363 A | 12/2000 | Herbst |
| 6,168,857 B1 | 1/2001 | Andersen et al. |
| 6,180,037 B1 | 1/2001 | Andersen et al. |
| 6,200,404 B1 | 3/2001 | Andersen et al. |

(56) References Cited

U.S. PATENT DOCUMENTS

| | | |
|---|---|---|
| 6,231,970 B1 | 5/2001 | Andersen et al. |
| 6,268,022 B1 | 7/2001 | Schlegel et al. |
| 6,299,970 B1 | 10/2001 | Richards et al. |
| 6,311,454 B1 | 11/2001 | Kempel |
| 6,327,821 B1 | 12/2001 | Chang |
| 6,347,934 B1 | 2/2002 | Andersen et al. |
| 6,379,446 B1 | 4/2002 | Andersen et al. |
| 6,402,830 B1 | 6/2002 | Scrapper |
| 6,434,899 B1 | 8/2002 | Fortin et al. |
| 6,475,275 B1 | 11/2002 | Nebesnak et al. |
| 6,485,561 B1 | 11/2002 | Dattel |
| 6,494,704 B1 | 12/2002 | Andersen et al. |
| 6,503,751 B2 | 1/2003 | Hugh |
| 6,528,151 B1 | 3/2003 | Shah et al. |
| 6,572,355 B1 | 6/2003 | Bauman et al. |
| 6,573,340 B1 | 6/2003 | Khemani et al. |
| 6,581,588 B2 | 6/2003 | Wiedemann et al. |
| 6,619,005 B1 | 9/2003 | Chen |
| 6,643,991 B1 | 11/2003 | Moyes |
| 6,665,997 B2 | 12/2003 | Chen |
| 6,668,499 B2 | 12/2003 | Degelsegger |
| 6,684,590 B2 | 2/2004 | Frumkin |
| 6,688,063 B1 | 2/2004 | Lee et al. |
| 6,696,979 B2 | 2/2004 | Manten et al. |
| 6,743,830 B2 | 6/2004 | Soane et al. |
| 6,745,526 B1 | 6/2004 | Autovino |
| 6,764,625 B2 | 7/2004 | Walsh |
| 6,766,621 B2 | 7/2004 | Reppermund |
| 6,779,859 B2 | 8/2004 | Koons |
| 6,818,055 B2 | 11/2004 | Schelinski |
| 6,843,543 B2 | 1/2005 | Ramesh |
| 6,866,081 B1 | 3/2005 | Nordgard et al. |
| 6,886,306 B2 | 5/2005 | Churchill et al. |
| 6,890,604 B2 | 5/2005 | Daniels |
| 6,961,998 B2 | 11/2005 | Furchheim et al. |
| 6,964,722 B2 | 11/2005 | Taylor et al. |
| 6,981,351 B2 | 1/2006 | Degelsegger |
| 7,059,092 B2 | 6/2006 | Harkin et al. |
| 7,090,897 B2 | 8/2006 | Hardesty |
| RE39,339 E | 10/2006 | Andersen et al. |
| 7,185,468 B2 | 3/2007 | Clark et al. |
| 7,241,832 B2 | 7/2007 | Khemani et al. |
| 7,279,437 B2 | 10/2007 | Kai et al. |
| 7,297,394 B2 | 11/2007 | Khemani et al. |
| 7,386,368 B2 | 6/2008 | Andersen et al. |
| 7,598,460 B2 | 10/2009 | Roberts, IV et al. |
| 7,617,606 B2 | 11/2009 | Robbins et al. |
| 7,669,383 B2 | 3/2010 | Darnell |
| 7,721,500 B2 | 5/2010 | Clark et al. |
| 7,775,013 B2 | 8/2010 | Bartlett et al. |
| 7,803,723 B2 | 9/2010 | Herbert et al. |
| 7,832,166 B2 | 11/2010 | Daniels |
| 7,886,501 B2 | 2/2011 | Bartlett et al. |
| 7,897,235 B1 | 3/2011 | Locher et al. |
| 7,927,420 B2 | 4/2011 | Francis |
| 7,964,051 B2 | 6/2011 | Lynch et al. |
| 8,037,820 B2 | 10/2011 | Daniels |
| 8,097,544 B2 | 1/2012 | Majors |
| 8,209,866 B2 | 7/2012 | Daniels |
| 8,381,381 B2 | 2/2013 | Daniels |
| 8,650,834 B2 | 2/2014 | Hardwick et al. |
| 8,915,033 B2 | 12/2014 | Daniels |
| 9,027,296 B2 | 5/2015 | Daniels |
| 9,475,732 B2 | 10/2016 | Daniels |
| 2001/0032367 A1 | 10/2001 | Sasage et al. |
| 2001/0047741 A1 | 12/2001 | Gleeson et al. |
| 2002/0053757 A1 | 5/2002 | Andersen et al. |
| 2002/0078659 A1 | 6/2002 | Hunt |
| 2002/0100996 A1 | 8/2002 | Moyes et al. |
| 2002/0124497 A1 | 9/2002 | Fortin et al. |
| 2002/0128352 A1 | 9/2002 | Soane et al. |
| 2002/0166479 A1 | 11/2002 | Jiang |
| 2003/0015124 A1 | 1/2003 | Klus |
| 2003/0033786 A1 | 2/2003 | Yulkowski |
| 2003/0084980 A1 | 5/2003 | Seufert et al. |
| 2003/0115817 A1 | 6/2003 | Blackwell et al. |
| 2003/0205187 A1 | 11/2003 | Carlson et al. |
| 2003/0209403 A1 | 11/2003 | Daniels |
| 2003/0211251 A1 | 11/2003 | Daniels |
| 2003/0211252 A1 | 11/2003 | Daniels |
| 2004/0026002 A1 | 2/2004 | Weldon |
| 2004/0231285 A1 | 11/2004 | Hunt et al. |
| 2004/0258901 A1 | 12/2004 | Luckevich |
| 2005/0092237 A1 | 5/2005 | Daniels |
| 2005/0227006 A1 | 10/2005 | Segall |
| 2005/0241541 A1 | 11/2005 | Hohn et al. |
| 2005/0284030 A1 | 12/2005 | Autovino et al. |
| 2006/0070321 A1 | 4/2006 | Au |
| 2006/0096240 A1 | 5/2006 | Fortin |
| 2006/0168906 A1 | 8/2006 | Tonyan et al. |
| 2006/0287773 A1 | 12/2006 | Andersen et al. |
| 2007/0021515 A1 | 1/2007 | Glenn et al. |
| 2007/0092712 A1 | 4/2007 | Hodson |
| 2007/0053852 A1 | 5/2007 | Khashoggi |
| 2007/0095570 A1 | 5/2007 | Roberts, IV et al. |
| 2007/0125043 A1 | 6/2007 | Clark et al. |
| 2007/0125044 A1 | 6/2007 | Clark et al. |
| 2007/0157537 A1 | 7/2007 | Nicolson et al. |
| 2007/0175139 A1 | 8/2007 | Nicolson et al. |
| 2007/0193220 A1 | 8/2007 | Daniels |
| 2007/0283660 A1 | 12/2007 | Blahut |
| 2008/0016820 A1 | 1/2008 | Robbins, Sr. et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0041014 A1 | 2/2008 | Lynch et al. |
| 2008/0066653 A1 | 3/2008 | Andersen et al. |
| 2008/0086982 A1 | 4/2008 | Parenteau et al. |
| 2008/0099122 A1 | 5/2008 | Andersen et al. |
| 2008/0145580 A1 | 6/2008 | McAllister et al. |
| 2008/0152945 A1 | 6/2008 | Miller |
| 2008/0156225 A1* | 7/2008 | Bury ............... C04B 28/02 106/14.05 |
| 2008/0286519 A1 | 11/2008 | Nicolson et al. |
| 2009/0151602 A1 | 6/2009 | Francis |
| 2009/0197991 A1* | 8/2009 | Bury ............... C04B 28/02 524/2 |
| 2010/0064943 A1 | 3/2010 | Guevara et al. |
| 2010/0071597 A1 | 3/2010 | Perez-Pena |
| 2010/0095622 A1 | 4/2010 | Niemoller |
| 2010/0136269 A1 | 6/2010 | Andersen et al. |
| 2011/0040401 A1 | 2/2011 | Daniels |
| 2011/0120349 A1 | 5/2011 | Andersen et al. |
| 2011/0131921 A1 | 6/2011 | Chen |
| 2011/0167753 A1 | 7/2011 | Sawyers et al. |
| 2012/0276310 A1 | 1/2012 | Andersen et al. |
| 2012/0164402 A1 | 6/2012 | Murakami |
| 2012/0208003 A1 | 8/2012 | Beard |
| 2013/0008115 A1 | 1/2013 | Bierman |
| 2013/0086858 A1 | 4/2013 | Daniels et al. |
| 2013/0216802 A1 | 8/2013 | Leung et al. |
| 2014/0000193 A1 | 1/2014 | Daniels et al. |
| 2014/0000195 A1 | 1/2014 | Daniels et al. |
| 2014/0000196 A1 | 1/2014 | Daniels et al. |

FOREIGN PATENT DOCUMENTS

| | | |
|---|---|---|
| CN | 101132999 A | 2/2008 |
| CN | 101239838 | 8/2008 |
| CN | 102001832 A | 11/2010 |
| CN | 102220829 A | 10/2011 |
| CN | 102643013 A | 8/2012 |
| CN | 102712531 A | 10/2012 |
| DE | 102006001544 A1 | 10/2007 |
| EP | 1266877 A2 | 12/2002 |
| EP | 2189612 A2 | 5/2010 |
| EP | 2230075 A1 | 9/2010 |
| EP | 2314462 A1 | 4/2011 |
| EP | 2583954 A1 | 4/2013 |
| GB | 1265471 A | 3/1972 |
| GB | 1508866 | 4/1978 |
| JP | H05-052075 A | 3/1993 |
| JP | H06-56497 A | 3/1994 |
| JP | 2004332401 A | 11/2004 |

(56) References Cited

FOREIGN PATENT DOCUMENTS

| | | |
|---|---|---|
| JP | 2008036549 A | 2/2008 |
| WO | 02/31306 A1 | 4/2002 |
| WO | 03/004432 A1 | 1/2003 |
| WO | 2006138732 | 12/2006 |
| WO | 2007051093 | 5/2007 |
| WO | 2007053852 | 5/2007 |
| WO | 20080144186 | 11/2008 |
| WO | 2011066192 | 6/2011 |
| WO | 2012084716 A1 | 6/2012 |

OTHER PUBLICATIONS

China Office Action CN201380034441.7 [English Translation] dated Sep. 6, 2015.
EP 14759514.4 Extended European Search Report dated Sep. 23, 2016.
Extended Search Report EP 13845068 dated Oct. 16, 2016.
Kralj et al: 11 Experimental study of recycling lightweight concrete with aggregates containing expanded glass 11 Process Safety and Environmental Protection Institution of Chemical Engineers, Rugby, GB, vol. 87, No. 4, Jul. 1, 2809 (Jul. 1, 2009), pp. 267-273.
European Extended Search Report for EP 14854429.9 dated Jun. 1, 2017.

\* cited by examiner

EXTRUDED GYPSUM-BASED MATERIALS

CROSS REFERENCE TO RELATED APPLICATIONS

This application claims priority to, and is the National Phase of International Application No. PCT/US2014/020865, filed on Mar. 5, 2014, which claims the benefit under 35 U.S.C. § 119(e) of U.S. Provisional Application Nos. 61/772,646 filed Mar. 5, 2013 and 61/772,648 filed Mar. 5, 2013 and 61/772,653 filed Mar. 5, 2013.

FIELD OF INVENTION

The present invention relates in general to the production of gypsum-based materials, and more particularly to products made by extruding gypsum-based materials (e.g., roofing tiles, wall panels, etc.).

BACKGROUND ART

Gypsum products are generally produced using large amounts of water to form a slurry that is too wet to extrude. As a result, various water-reducing elements have been developed to reduce the water content such that an extrusion process can be used to produce gypsum-based materials. See for example, U.S. Pat. No. 7,172,403 which is hereby incorporated by reference in its entirety.

There is, however, a need for a rheology-modified gypsum-based material (e.g., roofing tiles, wall panels, etc.) that can be extruded.

SUMMARY OF THE INVENTION

The present invention provides a rheology-modified gypsum-based material (e.g., roofing tiles, wall panels, etc.) that can be extruded.

More specifically, the present invention provides an extrudable gypsum-based material that is formed from a mixture that includes gypsum in the range of about 40 to 90% by dry weight percent, a secondary material in the range of about 0.1 to 50% by dry weight percent, a reinforcement fiber in the range of about 1 to 20% by dry weight percent, a rheology modifying agent in the range of about 0.5 to 10% by dry weight percent, a retarder in the range of about 0.1 to 8% by dry weight percent, a water in the range of 10 to 50% of a total wet material weight.

In addition, the present invention provides a method for manufacturing an extrudable gypsum-based material by mixing a gypsum, a secondary material, a reinforcement fiber, a rheology modifying agent and a retarder with water, extruding the mixture through a die using an extruder, and allowing the extruded mixture to set.

BRIEF DESCRIPTION OF THE DRAWINGS

For a more complete understanding of the features and advantages of the present invention, reference is now made to the detailed description of the invention along with the accompanying figures and in which:
Not applicable.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

As will be described below, the present provides an extrudable gypsum-based material that is formed from a mixture that includes gypsum in the range of about 40 to 90% by dry weight percent, a secondary material in the range of about 0.1 to 50% by dry weight percent, a reinforcement fiber in the range of about 1 to 20% by dry weight percent, a rheology modifying agent in the range of about 0.5 to 10% by dry weight percent, a retarder in the range of about 0.1 to 8% by dry weight percent, a water in the range of 10 to 50% of a total wet material weight.

Gypsum (Plaster of Paris, Calcium Sulfate hemihydrate) in its wet state before setting, can be rheologically modified in to a clay-like material, which allows the use of the conventional clay production methods known as extrusion.

For extrusion, the gypsum material with approx. 10-50 wt. % water and a suitable rheology modifying admixture is made to feel and behave similar to plastic clay. The material feels plastic/deformable to the touch and can be extruded similar to clay with the use of a clay extruder where the material is conveyed forward by an auger through a barrel and is formed continuously through a die into a final shape with form stability.

Depending on the water content and the amount of rheology modifying admixture, the extruded material can have more or less form stability.

To allow enough time of the gypsum-based material to be extruded before setting (hardening), the setting time can be retarded up to several hours with the use of small additions of suitable set retarders such as Sodate™ (USG Product) or sodium citrate. Sodate™ is a mixture of Plaster of Paris, sodium citrate and crystalline silica. Following extrusion, the material will within a few hours develop the final strength of the finished product.

The gypsum can be used as a binder with water in a composite composition in combination with a multitude of secondary materials such as sand, cement, fly ash, slag, rock, expanded light weight aggregate, etc., or a combination thereof, which when rheologically modified can be extruded as described above.

The rheology-modifying agents fall into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides.

Suitable cellulose-based rheology-modifying agents include, for example, methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC), or hydroxypropoylmethylcelluose (HPMC), etc.

Suitable starch-based materials include, for example, wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, and dialdehyde starches.

The currently preferred rheology-modifying agent is methylhydroxypropylcellulose, examples of which are Methocel™ 240 and Methocel™ 240S, both of which are available from DOW Chemicals, USA.

In one embodiment of the present invention, the compositional ranges of gypsum-based material can be:

| Component | Wt. % Range of Dry |
|---|---|
| Gypsum ($CaSO_4 \cdot \frac{1}{2}H_2O$) | 40-90 |
| Secondary material (e.g., sand, rock, fly ash, slag, cement, calcium carbonate, light weight aggregate, etc.) | 0.1-50 |
| Reinforcement fiber | 1-20 |
| Rheology modifying agent | 0.5-10 |
| Retarder | 0.1-8 |
| Water wt. % of total wet material | 10-50 |

The gypsum can be 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89% or 90% by weight or other incremental percentage between.

The water can be 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight or other incremental percentage between.

The secondary material can be 0.1%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43% 44%, 45%, 46%, 47%, 48%, 49% or 50% by weight or other incremental percentage between.

The reinforcement fiber can be 1%, 2%, 3%, 4%, 5%, 6%, 7%, 8%, 9%, 10%, 11%, 12%, 13%, 14%, 15%, 16%, 17%, 18%, 19% or 20% by weight or other incremental percentage between.

The rheology modifying agent can be 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0% by weight or other incremental percentage between.

The retarder can be 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9% or 8.0% by weight or other incremental percentage between.

In addition, the present invention provides a method for manufacturing an extrudable gypsum-based material by mixing a gypsum, a secondary material, a reinforcement fiber, a rheology modifying agent and a retarder with water, extruding the mixture through a die using an extruder, and allowing the extruded mixture to set (e.g., up to 2 to 3 hours, etc).

Additional steps may include: (1) drying the extruded mixture; (2) curing the extruded mixture; (3) molding, cutting, trimming, sanding or routing the extruded mixture into a specified shape (e.g., a roofing tile, wall panel, etc.); (4) spraying the extruded mixture with a water repellent; and/or (5) decorating one or more surfaces of the extruded mixture by printing at least one image on the one or more surfaces or laminating a veneer on the one or more surfaces, or etching the at least one image on the one or more surfaces.

Roofing Tiles

Gypsum-based roofing tiles can be produced from Plaster of Paris (Calcium Sulfate hemihydrate) that in it's wet state with water (16-25 wt. %) has been rheologically modified to have clay-like properties.

The roofing tiles can be produced in a number of ways that is known in the art of clay and concrete technology:
1) Extrusion with a clay extruder through a die into the final shape of the roofing tiles.
2) Extrusion with a clay extruder through a die into a sheet of thickness equal to or bigger than the final thickness of the tiles and a width that allows for the width of one or multiple tiles. The sheet is formed into the shape of the final tiles either by placing the sheet over a bottom mold half in a vertical press or running the sheet through forming calenders.
3) Extruding cylindrical pieces of material that are subsequently formed into the final tile shape between bottom and top molds in a vertical press or similar.
4) By mixing the rheologically modified material and placing finite metered pieces of the material that are subsequently formed into the final tile shape between bottom and top molds in a vertical press or similar.

Following setting within a couple of hours, the roofing tiles are dried in an oven. Typically the roofing tiles will have a thickness range of 5 mm to 40 mm.

The mechanical properties are modified to generate a ductile (non-brittle) material by the addition of fiber reinforcement such as cellulose fiber, glass fiber, polypropylene fiber, polyvinyl alcohol (PVA) fiber, Dolanit® fiber (generic name: homopolymer acrylic or alkali-resistant fiber), or similar, or combination thereof.

The tiles are made water resistant by treating the surface of the product to a water repellent silane or water resistant surface coating known in state-of-the-art. Freeze-Thaw resistance can be accomplished by incorporating microballoons in the composite composition.

Compared to state-of-the-art roofing tiles, the roofing tiles of the present invention are lighter, thinner, more ductile, more durable and less costly.

Wall Panels

Gypsum-based wall panels can be produced from Plaster of Paris (Calcium Sulfate hemihydrate) that in it's wet state with water (16-25 wt. %) has been rheologically modified to have clay-like properties.

A wall for a bathroom stall interior passage hall is made from a composite material using gypsum (Plaster of Paris, Calcium Sulfate hemihydrate) as the binder.

The composite material in it's wet state before setting of the gypsum, is rheologically modified into a clay-like material, which allows the use of the conventional clay production methods known as extrusion to form the shape of the wall.

The composition of the composite material can be formulated to make the wall: lightweight, dense, fire resistant, sound resistant, durable and non-brittle. Typically the wall panels will have a thickness range of 5 mm to 250 mm.

Following setting and drying of the finished product, the surface of the wall element can be made water resistant with the use of silanes or surface coatings. Further, the surface can be decorated by printing onto the surface, by laminating veneer onto the surface or by printing "Nerewood" onto the surface. For example, U.S. Pat. No. 6,964,722 entitled "Method for Producing a Wood Substrate Having an Image on at Least One Surface" or U.S. Patent Application Ser. No. 61/713,240 and PCT Patent Application Serial No. PCT/US2013/064435 entitled "Method for Producing a Substrate Having an Image on at Least One Surface", all of which are hereby incorporated herein by reference in their entirety.

It may be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications, patents and patent applications mentioned in the specification are indicative of the level of skill of those skilled in the art to which this invention pertains. All publications, patents and patent applications are herein incorporated by reference to the same extent as if each individual publication, patent or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it may be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. An extrudable gypsum-based material formed from a mixture comprising:
   a calcium sulfate hemihydrate in the range of about 40 to 90% by dry weight percent;
   a secondary material in the range of about 0.1 to 50% by dry weight percent selected from sand, cement, fly ash, slag, rock, expanded light weight aggregate, or a combination thereof;
   a reinforcement fiber in the range of about 1 to 20% by dry weight percent;
   a rheology modifying agent in the range of about 0.5 to 10% by dry weight percent selected from a polysaccharide, a polysaccharide derivative, a protein, a protein derivative, a synthetic organic material, a synthetic organic material derivative, or a combination thereof;
   a retarder in the range of about 0.1 to 8% by dry weight percent;
   a water in the range of 16 to 25% of a total wet material weight; and
   the mixture is extrudable.

2. The extrudable gypsum-based material as recited in claim 1, the reinforcement fiber comprising cellulose fiber, glass fiber, polypropylene fiber, polyvinyl alcohol (PVA) fiber, homopolymer acrylic or alkali-resistant fiber, or a combination thereof.

3. The extrudable gypsum-based material as recited in claim 1, the polysaccharide comprising a cellulose-based material, a cellulose-based material derivative, a starch-based material, a starch-based material derivative, or a combination thereof.

4. The extrudable gypsum-based material as recited in claim 3, the cellulose-based material is selected from the group consisting of methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) and hydroxypropylmethylcellulose (HPMC).

5. The extrudable gypsum-based material as recited in claim 3, the starch-based material is selected from the group consisting of wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches.

6. The extrudable gypsum-based material as recited in claim 1, the retarder comprising sodium citrate, or a mixture of Plaster of Paris, sodium citrate and crystalline silica.

7. The extrudable gypsum-based material as recited in claim 1, wherein the extrudable gypsum-based material comprises a roofing tile or a wall panel.

8. A method for manufacturing an extrudable gypsum-based material comprising the steps of:
   mixing a calcium sulfate hemihydrate in the range of about 40 to 90% by dry weight percent, a secondary material in the range of about 0.1 to 50% by dry weight percent selected from sand, cement, fly ash, slag, rock, expanded light weight aggregate, or a combination thereof, a reinforcement fiber in the range of about 1 to 20% by dry weight percent, a rheology modifying agent in the range of about 0.5 to 10% by dry weight percent selected from a polysaccharide, a polysaccharide derivative, a protein, a protein derivative, a synthetic organic material, a synthetic organic material derivative, or a combination thereof, and a retarder in the range of about 0.1 to 8% by dry weight percent with water in the range of 16 to 25% of a total wet material weight;
   extruding the mixture through a die using an extruder; and
   allowing the extruded mixture to set.

9. The method as recited in claim 8, the reinforcement fiber comprising cellulose fiber, glass fiber, polypropylene fiber, polyvinyl alcohol (PVA) fiber, homopolymer acrylic or alkali-resistant fiber, or a combination thereof.

10. The method as recited in claim 8, the polysaccharide comprising a cellulose-based material, a cellulose-based material derivative, a starch-based material, a starch-based material derivative, or a combination thereof.

11. The method as recited in claim 10, the cellulose-based material is selected from the group consisting of methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) and hydroxypropylmethylcellulose (HPMC).

12. The method as recited in claim 10, the starch-based material is selected from the group consisting of wheat starch, pre-gelled wheat starch, potato starch, pre-gelled potato starch, amylopectin, amylose, seagel, starch acetates, starch hydroxyethyl ethers, ionic starches, long-chain alkyl-starches, dextrins, amine starches, phosphate starches, or dialdehyde starches.

13. The method as recited in claim 8, the retarder comprising sodium citrate, or a mixture of Plaster of Paris, sodium citrate and crystalline silica.

14. The method as recited in claim 8, wherein the extruded mixture is allowed to set for 2 to 3 hours.

15. The method as recited in claim 8, further comprising the step of curing the extruded mixture.

16. The method as recited in claim 8, further comprising the step of drying the extruded mixture.

17. The method as recited in claim 8, further comprising the step of molding, cutting, trimming, sanding or routing the extruded mixture into a specified shape.

18. The method as recited in claim 17, wherein the specified shape comprises a roofing tile or a wall panel.

19. The method as recited in claim 18, wherein:
   the roofing tile has a thickness of between about 5 mm to 40 mm; and
   the wall panel has a thickness of between about 5 mm to 250 mm.

20. The method as recited in claim 8, further comprising the step of spraying the extruded mixture with a water repellent.

21. The method as recited in claim 8, further comprising the step of decorating one or more surfaces of the extruded mixture by printing at least one image on the one or more surfaces or laminating a veneer on the one or more surfaces, or etching the at least one image on the one or more surfaces.

* * * * *